(12) United States Patent
Mongia et al.

(10) Patent No.: US 7,872,864 B2
(45) Date of Patent: Jan. 18, 2011

(54) DUAL CHAMBER SEALED PORTABLE COMPUTER

(75) Inventors: Rajiv Mongia, Fremont, CA (US); James G. Hermerding, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 12/242,617

(22) Filed: Sep. 30, 2008

(65) Prior Publication Data

US 2010/0079940 A1  Apr. 1, 2010

(51) Int. Cl.
    *H05K 7/20* (2006.01)
(52) U.S. Cl. ............................ 361/695; 361/694
(58) Field of Classification Search .......... None
    See application file for complete search history.

(56) References Cited

U.S. PATENT DOCUMENTS

| | | | | |
|---|---|---|---|---|
| 5,689,403 A | * | 11/1997 | Robertson et al. | 361/695 |
| 5,704,212 A | * | 1/1998 | Erler et al. | 62/3.2 |
| 5,773,755 A | * | 6/1998 | Iwatare | 174/17 VA |
| 5,926,367 A | * | 7/1999 | Gutierrez et al. | 361/695 |
| 6,276,448 B1 | * | 8/2001 | Maruno | 165/185 |
| 6,430,042 B1 | * | 8/2002 | Ohashi et al. | 361/679.49 |
| 6,817,940 B2 | * | 11/2004 | Pfannenberg | 454/184 |
| 7,289,320 B2 | * | 10/2007 | Chang et al. | 361/690 |
| 7,336,489 B1 | * | 2/2008 | Chen et al. | 361/700 |
| 7,525,802 B2 | * | 4/2009 | Yu et al. | 361/701 |
| 2006/0268534 A1 | * | 11/2006 | Paydar et al. | 361/814 |
| 2006/0285291 A1 | * | 12/2006 | Elkins | 361/695 |

\* cited by examiner

*Primary Examiner*—Gregory D Thompson
(74) *Attorney, Agent, or Firm*—Ryder, Lu, Mazzeo and Konieczny, LLC; Douglas J. Ryder

(57) ABSTRACT

In general, in one aspect, the disclosure describes a laptop computer that can allow for enhanced cooling of a passively cooled notebook while maintaining the desired waterproof and dust resistance of the design. This is achieved by creating a separate cooling channel where air can flow through to provide cooling to an electronics enclosure connected thereto. The cooling channel may utilize membranes (e.g., hydrophobic membranes) to protect again water and dust penetration. In some cases, two fans are used in opposite directions in order to automatically clean the membranes from dust accumulation.

17 Claims, 7 Drawing Sheets

DUAL CHAMBER SEALED PORTABLE COMPUTER

BACKGROUND

Some notebook computers are designed to be sealed to the exterior ambient to maintain a waterproof (or resistant) and dustproof (or resistant) computer. These computers utilize no external venting since the external venting could provide a liquid and/or dust path into the notebook, resulting in a notebook susceptible to the elements. The cooling for these computers was provided passively utilizing devices to dissipate the heat (heat sinks). The "sealed" computer worked well when platform powers were low; however, increased performance requirements are making it challenging to achieve the necessary cooling in a sealed design.

BRIEF DESCRIPTION OF THE DRAWINGS

The features and advantages of the various embodiments will become apparent from the following detailed description in which.

DETAILED DESCRIPTION

Figure 1A:
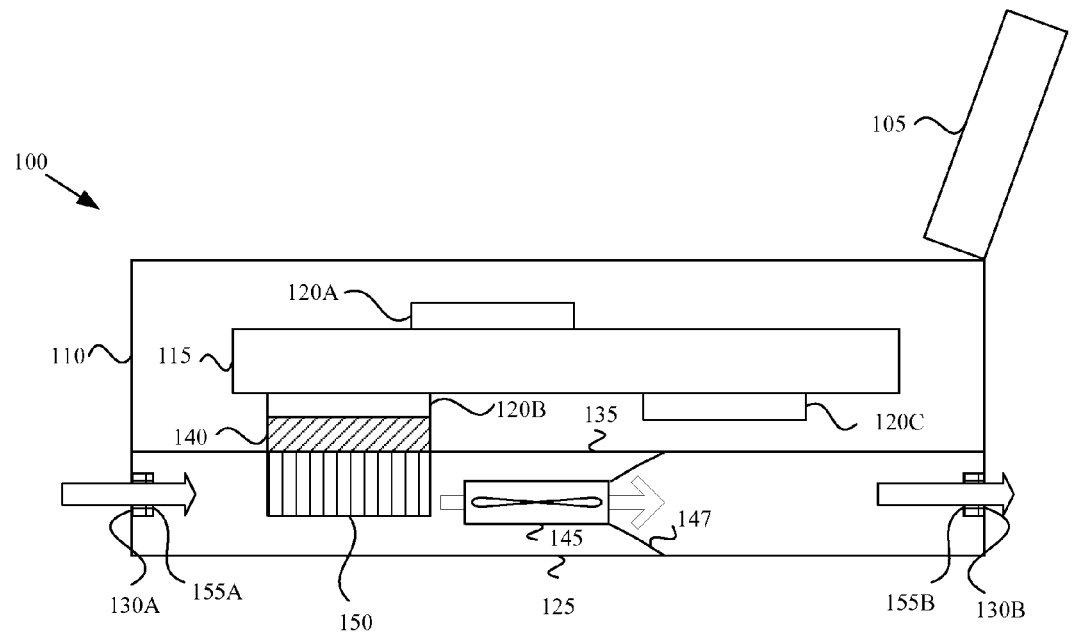
FIG. 1A illustrates a side view of an example two-chamber notebook computer with a display in an open position, according to one embodiment.

FIG. 1A illustrates a side view of an example two-chamber notebook computer 100. The computer includes a display 105 illustrated in an open position. A first chamber 110 is an electronics enclosure where the notebook electronics are contained. The first chamber 110 may include a motherboard 115 having one or more integrated circuits or other electronic components 120A-C connected thereto (three illustrated). The first chamber 110 is isolated from the external environment (is sealed) to provide a water and dust proof (or water and dust resistant) environment. A second chamber 125 is a cooling channel where airflow is generated in order to properly cool the notebook computer 100 (electronics contained within the first chamber 110). The second chamber 125 is illustrated as being below the first chamber 110 and running from front to back of the computer 100 but is not limited thereto. The second chamber 125 may include openings 130A-B to the external environment to permit air to flow therethrough. As illustrated, the second chamber 125 includes an inlet 130A in the front and an outlet 130B in the back and air flows from the front of the computer 100 to the back. The openings 130A-B are in no way intended to be limited in number, location, or the direction of airflow they provide.

The first chamber 110 and the second chamber 125 share a common wall 135, the common wall 135 is where the heat is transferred from the electronics enclosure 110 to the cooling channel 125. If necessary, one or more of the electronic components 120 may be put into thermal contact with the common wall 135 in order to enhance the component cooling. As illustrated, a heat transfer component (e.g., a thermal interface material or a heat pipe) 140 is used to provide a connection between the electronic component 120B and the common wall 135. The second chamber 125 may include a fan 145 to aid in circulating air therethrough. The fan 145 may include 147 walls extending from an outlet of the fan 145 to separate the fan outlet from a fan inlet to prevent backflow.

In the event additional cooling is required, a heat dispersion component (e.g., fins) 150 may be included within the second chamber 125 to disperse the heat from the common wall 135. The fins 150 provide additional surface area for the heat to be dispersed and cooled by the airflow. The fins 150 may be connected to a hot spot (or hot spots) on the common wall 135. The hot spots may be adjacent to components drawing excessive heat in the electronics enclosure 110 (e.g., component 120B).

The openings 130A-B in the second chamber 125 may enable water or dust particles to enter the second chamber 125. While the second chamber 125 is separate and isolated from the first chamber 110, it may not be desirable to have water and dust particles in that close of proximity to the first chamber 110. Accordingly, each opening 130A-B may be fitted with at least one membrane (e.g., hydrophobic membrane) 155A-B, in order to seal an inlet 130A and an outlet 130B of the cooling channel 125. The hydrophobic membranes 155A-B would be designed to achieve the necessary airflow through the cooling channel 125 (e.g., from the fan or fans 145) while still inhibiting entry of water and dust (e.g., provide the desired water proofing (resistance) for the computer 100). It should be noted that the membranes 155A-B are not limited to hydrophobic membranes. Rather, other materials could be utilized that would provide sufficient airflow and prevent (or limit) the amount of dust and/or liquid capable of flowing therethrough without departing from the scope.

Figure 1B:
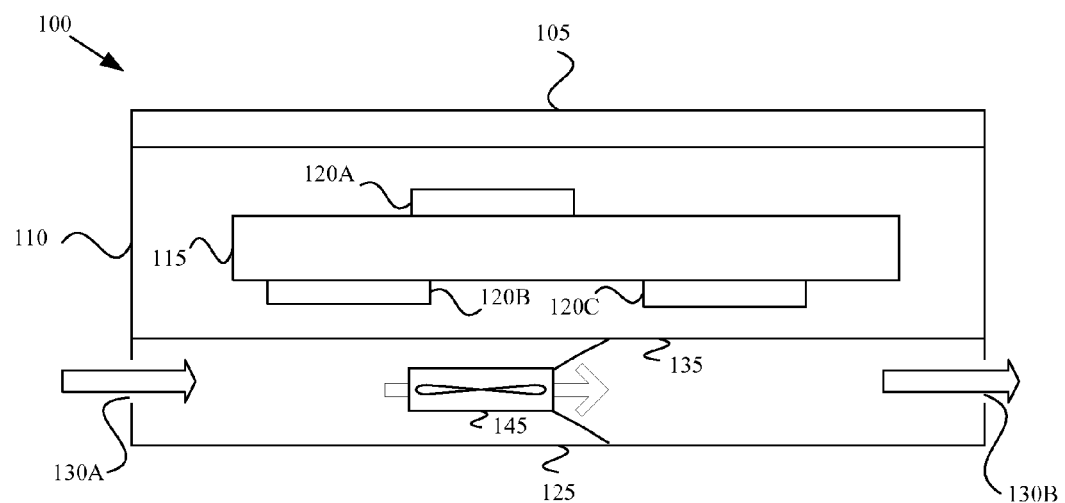
FIG. 1B illustrates a front view of an example two-chamber notebook computer with the display in a closed position, according to one embodiment.

FIG. 1B illustrates a front view of an example two-chamber notebook computer 160. The computer 160 may include many (or all) of the same components as the computer 100 and those components illustrated are labeled with the same reference numbers (components not illustrated are in no way intended to be excluded). The display 105 is illustrated in a closed position. The second chamber 125 is illustrated as being below the first chamber 110 and running from side to side of the computer 100 but is not limited thereto. As illustrated, the inlet 130A and outlet 130B are on the left and right side of the computer 100 respectively and air flows from left to right. Again it should be noted that the openings 130A-B are in no way intended to be limited in number, location, or the direction of airflow they provide.

The membranes 155A-B utilized to prevent (or inhibit) water and dust flow may become clogged with dust over time. As the dust builds up the airflow may become restricted and/or the dust may enter the second chamber 125. Restricted airflow may affect the cooling provided to the computer 100.

Figure 2A:
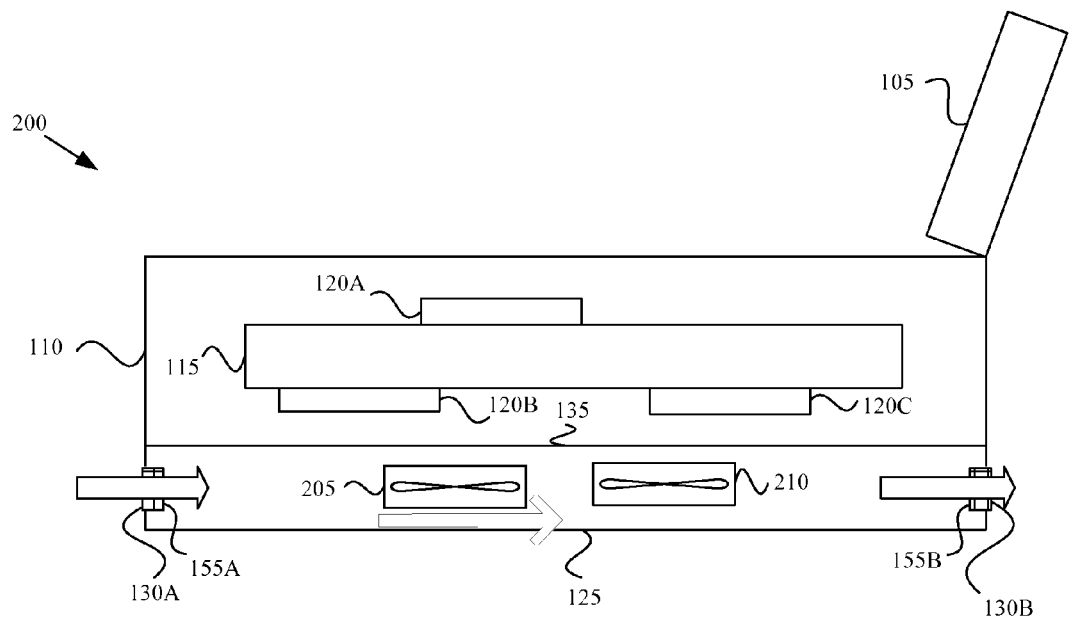
FIGS. 2A-B illustrate side views of an example two-chamber notebook computer, according to one embodiment.
Figure 2B:
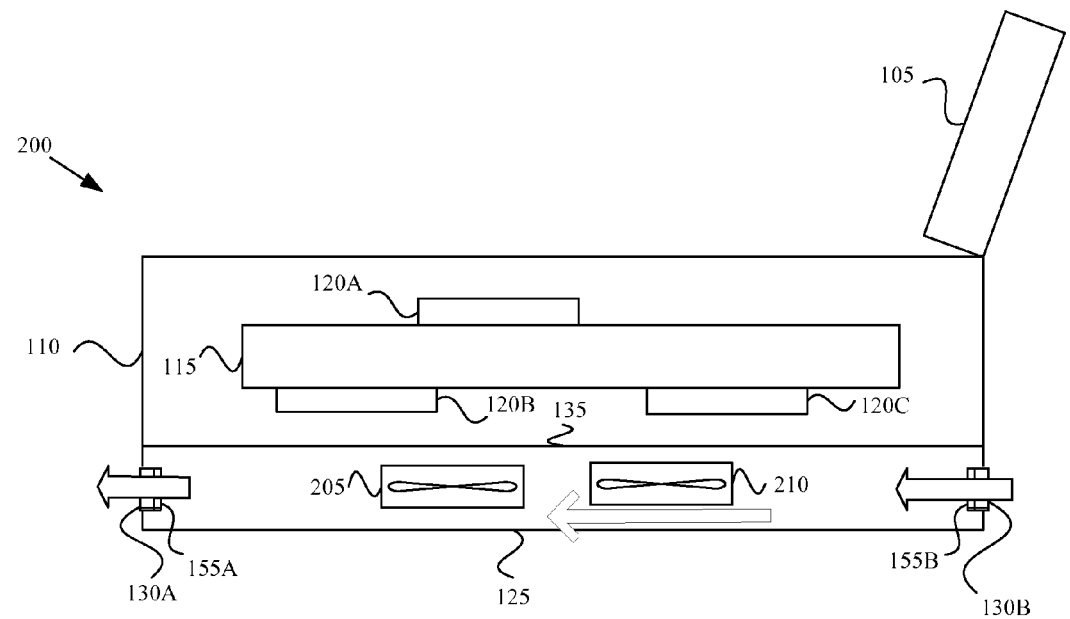

FIGS. 2A-B illustrate side views of an example two-chamber notebook computer 200. The computer 200 may include many (or all) of the same components as the computer 100 and those components illustrated are labeled with the same reference numbers (components not illustrated are in no way intended to be excluded). The display 105 is illustrated in an open position. The second chamber 125 includes two fans 205, 210 to create the airflow therethrough. The fans 205, 210 may create the airflow in alternate directions (e.g., opposite) with one fan creating airflow in a first direction and the other fan creating airflow in a second direction. Only one fan may be active (on) at any given time. For example, the fan 205 may circulate in a direction that creates an airflow from the front of the computer 200 to the back of the computer 200 (FIG. 2A) and the fan 210 may create an opposite airflow (FIG. 2B).

The fan that is operational may switch based on any number of parameters. For example, the operational fan may switch at predetermined intervals (e.g., every 20 minutes), after a certain number of computer 200 starts (e.g., every 3 starts), in response to the airflow being restricted in a certain direction (possibly indicating a clogged inlet vent), or in response to a determination that an inlet vent is clogged. By reversing the flow of air through the cooling channel 125, the dust that has collected in the inlet vent may be blown out. For example, when fan 205 is on (operational) and the fan 210 is off creating the airflow through the cooling channel 125 from front to back, the opening 130A and membrane 155A may act as an inlet and capture dust. When the fan 205 is turned off and the fan 210 becomes operational the opening/membrane 130A/155A becomes an outlet and dust captured therewithin may be blown out. By switching the airflow and blowing accumulated dust out of the vents the overall airflow and cooling provided thereby may remain relatively constant over time.

Rather then utilizing two fans 205, 210 to create airflow in alternate directions (and to blow accumulated dust out) a single fan that is capable of operating in two directions may be used. The direction of the fan may be switched in a similar fashion to switching between the fans 205, 210.

Figure 3A:
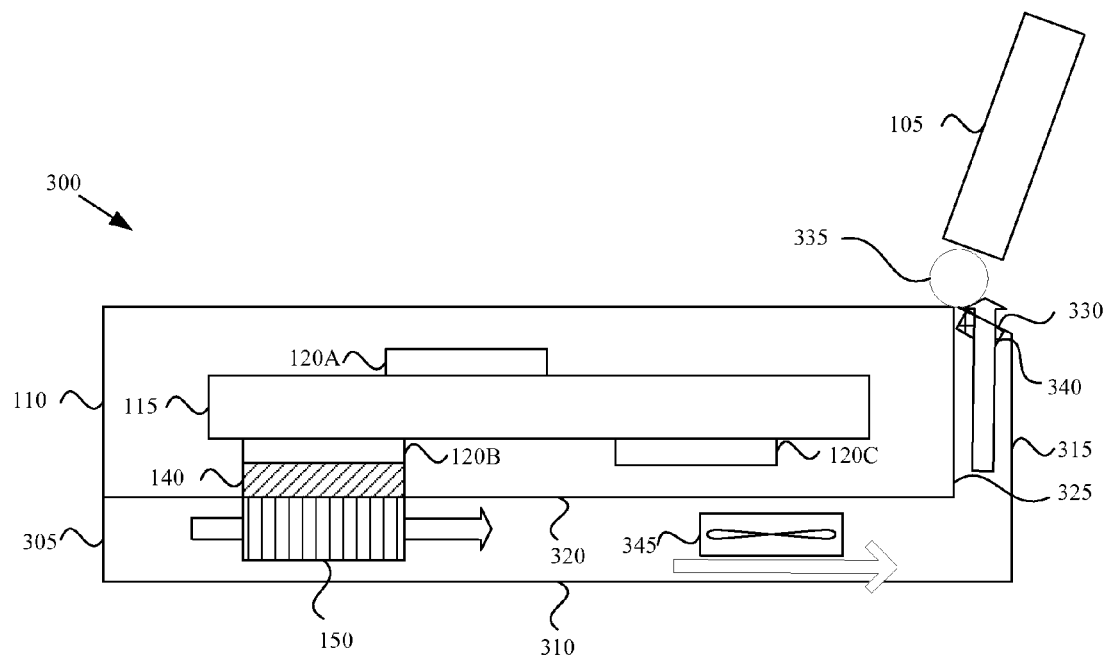
FIGS. 3A-B illustrates a side view and top view of an example two-chamber notebook computer, according to one embodiment.
Figure 3B:
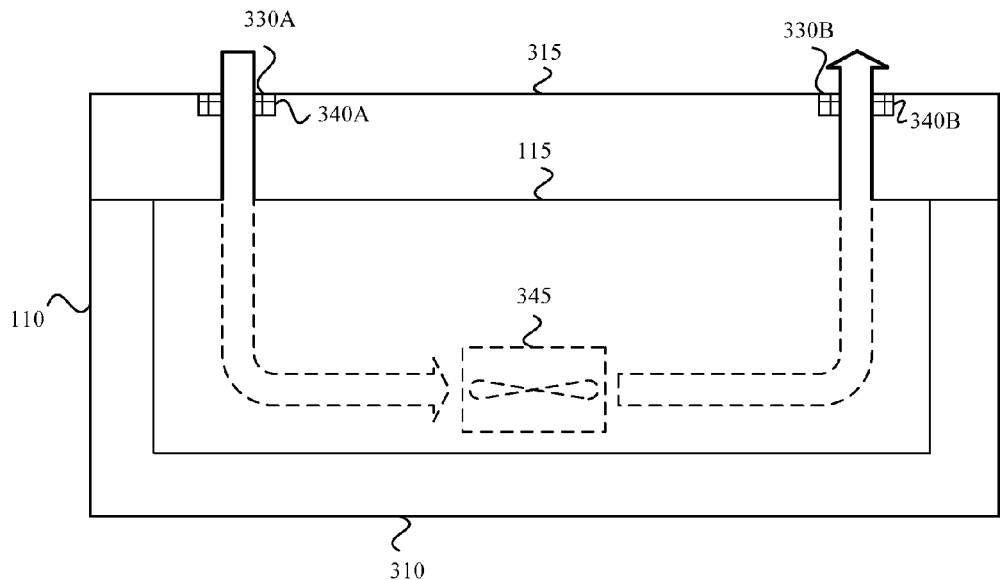

FIGS. 3A-B illustrates a side view and top view of an example two-chamber notebook computer 300. The computer 300 may include many (or all) of the same components as the computer 100 and those components illustrated are labeled with the same reference numbers (components not illustrated are in no way intended to be excluded). Referring to FIG. 3A, the display 105 is illustrated in an open position. The computer 300 includes a second chamber (cooling channel) 305, and the second chamber may include a lower extension 310 extending along the bottom of the computer 300 (first chamber 110) and a side extension 315 extending up the back of the computer 300 (first chamber 110). The second chamber 305 may have two common walls 320, 325 with the first chamber 110. The wall 320 being common between the lower extension 310 and the bottom of the first chamber 110 and the wall 325 being common between the side extension 315 and a rear wall of the first chamber 110. The second chamber 305 may have openings 330 (only one visible) formed in a top edge of the side extension 315. The openings 330 may be at least partially located beneath the display 105 and/or a hinge 335 used to open the display 105. The placement of the openings 330 below the display 105 and/or hinge 335 may aid in keeping the dust out of the second chamber 305. It may also protect the openings 330 from damage or dust build-up. The openings 330 may include membranes (e.g., hydrophobic membranes) 340 in order to seal the openings 330. A fan 345 may be used to create airflow through the second chamber 305.

Referring to FIG. 3B, the airflow may be through an inlet (opening 330A, membrane 340A), down the side extension 315, along the lower extension 310, back up the other side of the side extension 315, and then out an outlet (opening 330B, membrane 340B). The airflow along the bottom of the second chamber 305 may be below the motherboard 115 that is within the first chamber 105 (airflow and fan 345 beneath the first chamber 105 illustrated as dashed). According to one embodiment, a second fan (not illustrated) can be utilized in order to create airflow in the opposite direction as the fan 345. The fan that is operational may be switched to rotate the direction of the airflow through the second chamber 305. As noted above with respect to FIGS. 2A-B, rotating the airflow may be used to keep the inlets free of dust so as not to restrict the airflow so that a constant airflow may be maintained.

FIGS. 1-3 have illustrated the electronics enclosure 110 having a level bottom surface and the cooling channel 125, 305 having a level upper surface and a shared common wall 135, 320 with the bottom surface of the electronics enclosure 110. The electronics enclosure and the cooling channel are in no way intended to be limited thereby.

Figure 4:
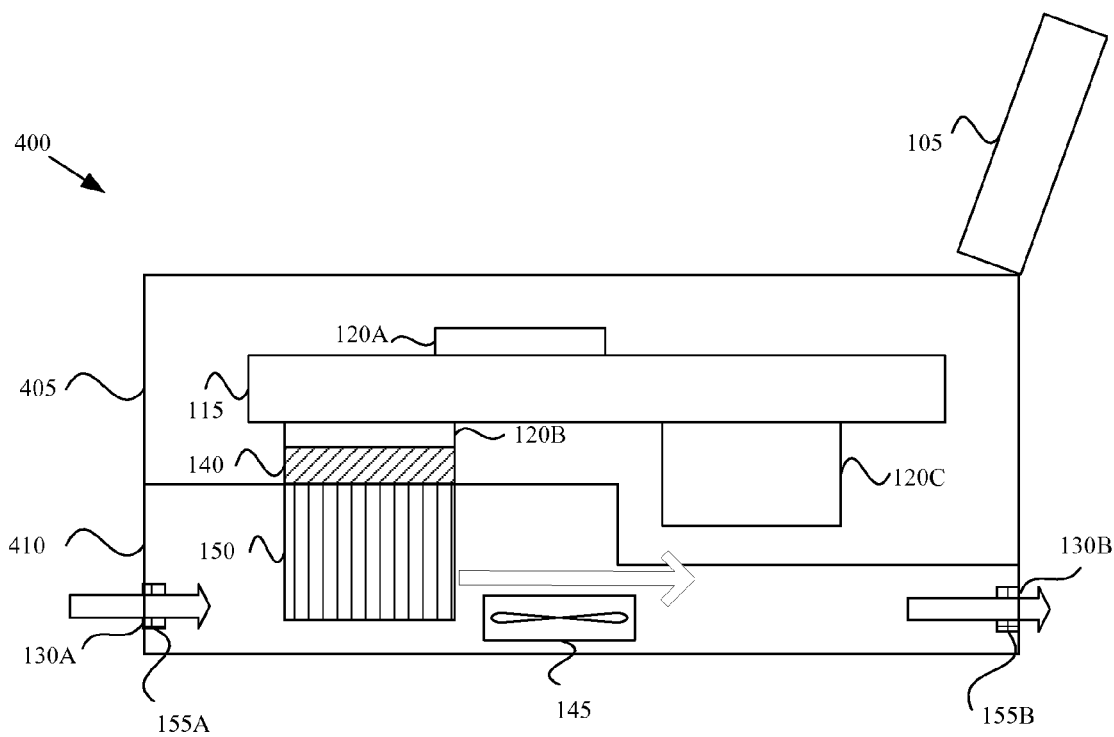
FIG. 4 illustrates a side view an example two-chamber notebook computer, according to one embodiment.

FIG. 4 illustrates a side view an example two-chamber notebook computer 400. The computer 400 may include many (or all) of the same components as the computer 100 and those components illustrated are labeled with the same reference numbers (components not illustrated are in no way intended to be excluded). The display 105 is illustrated in an open position. A first chamber 405 includes a staggered lower surface and a second chamber 410 includes a staggered upper surface. The staggered surfaces enable the computer 400 to have a flat bottom even though the electronics enclosure 405 need not be flat. This enables more flexibility in the design and layout of the electronics enclosure 405.

Figure 5:
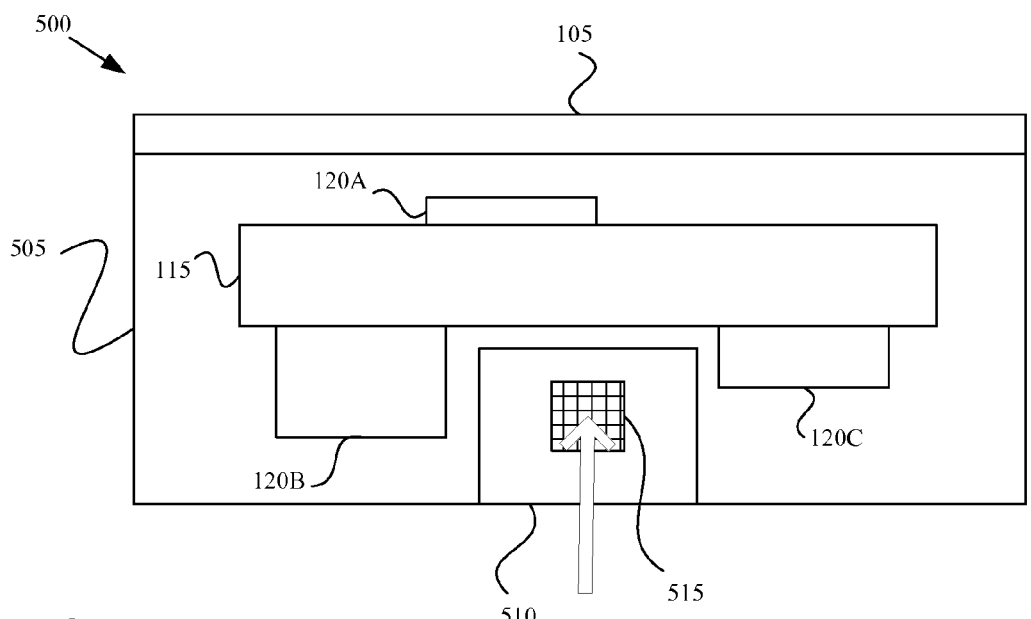
FIG. 5 illustrates a front view an example two-chamber notebook computer, according to one embodiment.

FIG. 5 illustrates a front view an example two-chamber notebook computer 500. The computer 500 may include many (or all) of the same components as the computer 100 and those components illustrated are labeled with the same reference numbers (components not illustrated are in no way intended to be excluded). The display 105 is illustrated in a closed position. A second chamber (cooling channel) 510 extends through middle of a lower portion of a first chamber (electronics enclosure) 505. The second chamber 510 may include openings (not illustrated separately) and the openings may include membranes 515. The second chamber 510 may include a fan (not illustrated) to circulate the air therethough. As illustrated the air is circulated from a front to a back of the computer 500.

Figure 6:
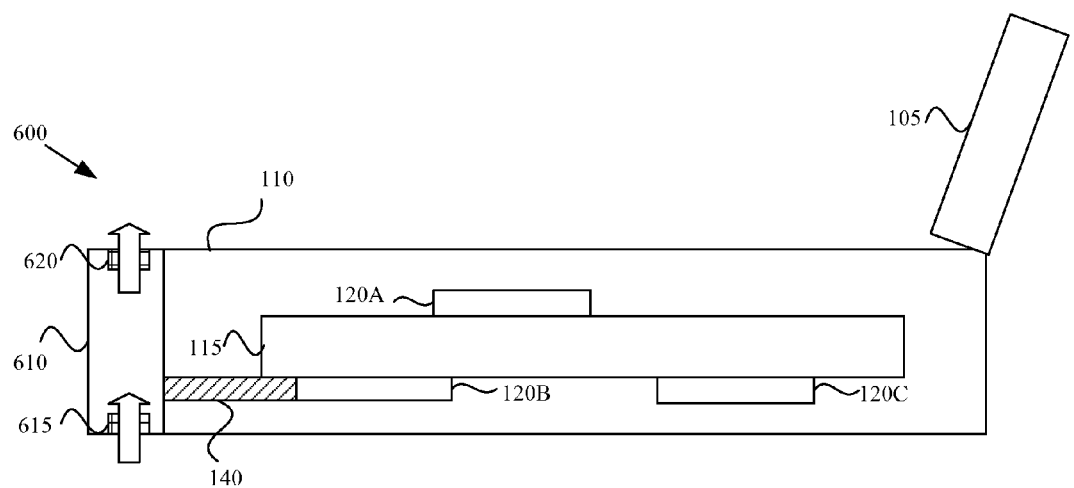
FIG. 6 illustrates a side view an example two-chamber notebook computer, according to one embodiment.

FIG. 6 illustrates a side view an example two-chamber notebook computer 600. The computer 600 may include many (or all) of the same components as the computer 100 and those components illustrated are labeled with the same reference numbers (components not illustrated are in no way intended to be excluded). The display 105 is illustrated in an open position. The computer includes a second chamber (cooling channel) 610 that extends along the front of a first chamber (electronics enclosure) 110. The second chamber 610 may include an inlet 615 and an outlet 620 for circulating air therethrough. Heat is transferred from the electronics enclosure 110 to the cooling channel 610 by the use of a heat transfer component 140 (e.g. a heat pipe).

Figure 7:
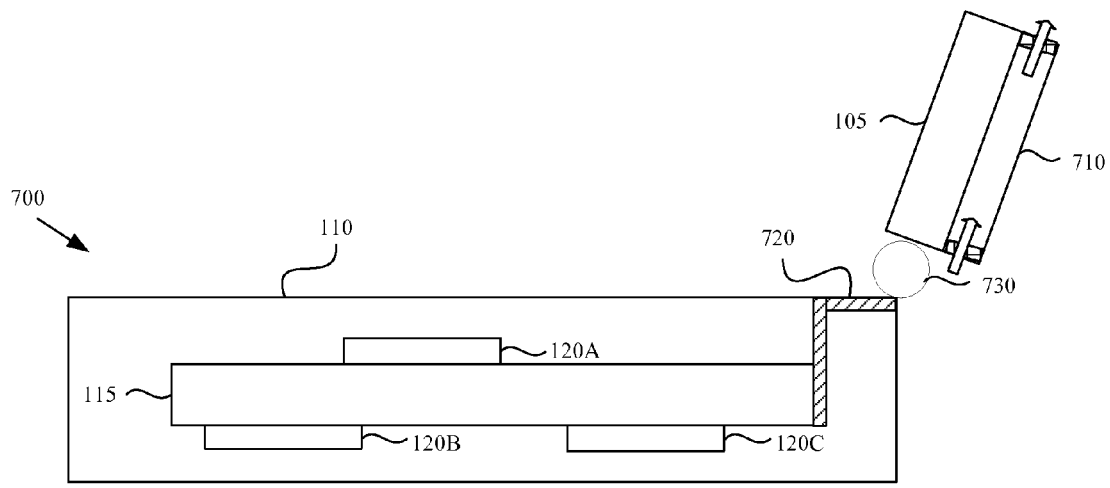
FIG. 7 illustrates a side view an example notebook computer having a cooling channel, according to one embodiment.

FIG. 7 illustrates a side view an example notebook computer 700 having a cooling channel 710. The computer 700 may include many (or all) of the same components as the computer 100 and those components illustrated are labeled with the same reference numbers (components not illustrated are in no way intended to be excluded). The display 105 is illustrated in an open position. The electronics enclosure 110 includes a heat transfer element 720 that transfers heat from the electronics enclosure 110 to a hinge 730 that opens and closes the display 105. The display 105 includes the second chamber (cooling channel) 710 connected to an outer surface of the display 105 for cooling of the display 105 and the heat transferred from the electronics enclosure 110. The use of the cooling channel 710 on the display 105 enables more heat to be dissipated in the display 105. The cooling channel 710 may include a fan or multiple fans to circulate air therethrough.

Figure 8:
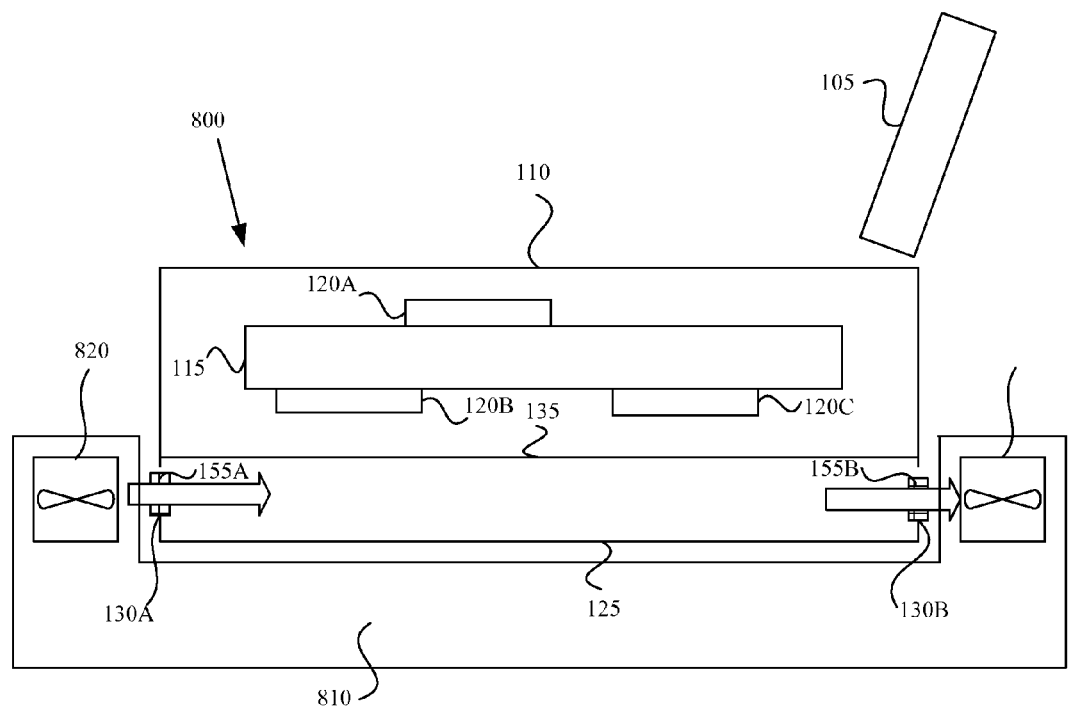
FIG. 8 illustrates a side view of an example two-chamber notebook computer housed in a docking station that includes fans in alignment with the openings, according to one embodiment.

According to one embodiment, a cooling channel (second chamber) of a two-chamber computer may utilize an external fan for providing airflow therethrough. The airflow provided by the external fan may be in addition to the airflow created by a fan within the cooling channel or may be in place of the internal fan. The external fan may be provided by a docking station utilized to house the notebook computer. The docket station may require fans that are aligned with the openings in the cooling channel. Using an external fan may enable the cooling channel to be thinner. FIG. 8 illustrates a side view of an example two-chamber notebook computer 800 housed in a docking station 810 that includes fans 820 in alignment with the openings 130A-B.

Figure 9:
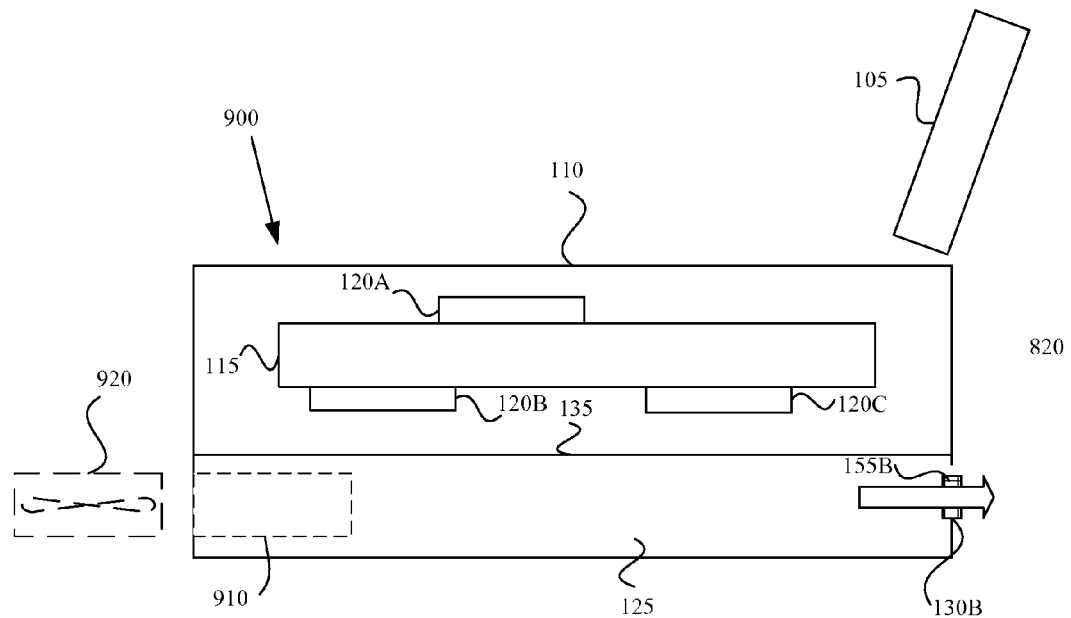
FIG. 9 illustrates a side view of an example two-chamber notebook computer where the second chamber includes a receptacle to receive a plug-and-play fan, according to one embodiment.

The cooling channel may include a receptacle for receiving an external fan. The external fan may be a plug-an-play fan that could be connected into the receptacle in the cooling channel, much like a disk drive and/or battery are plugged into receptacles in the housing of laptop computers. The plug-and-play fan may fit within the cooling channel or may extend out from the cooling channel. FIG. 9 illustrates a side view of an example two-chamber notebook computer 900 where the second chamber includes a receptacle 910 to receive a plug-and-play fan 920.

Figure 10:
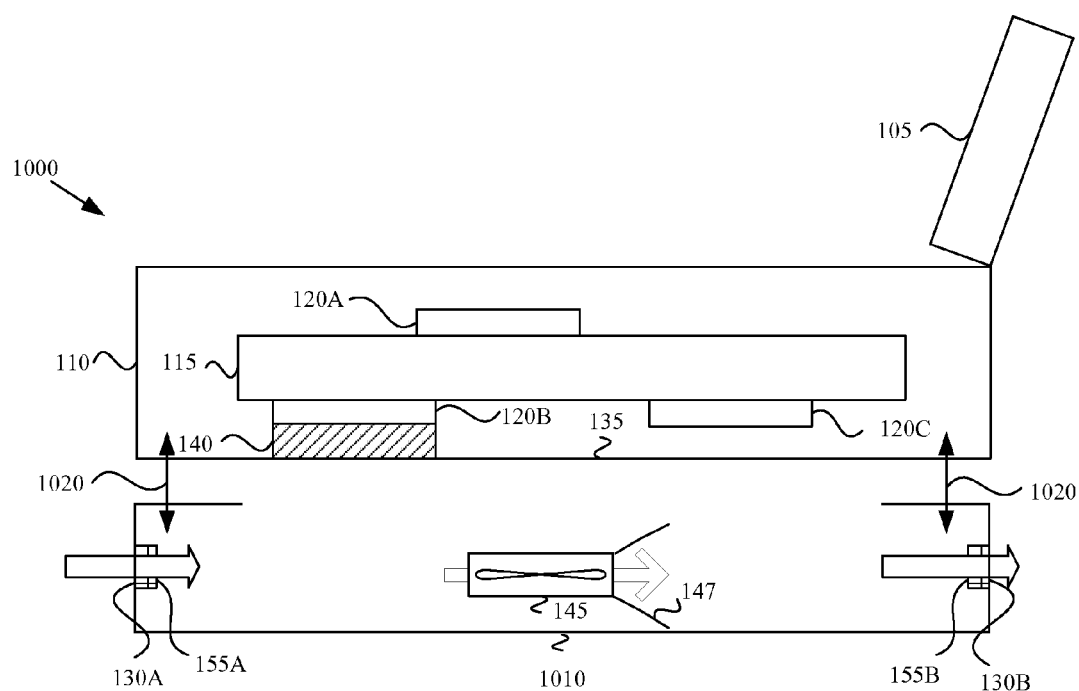
FIG. 10 illustrates a side view of an example two-chamber notebook computer having a cooling channel that is removably connected to the electronics enclosure in a removed configuration, according to one embodiment.

According to one embodiment, the cooling channel may not be permanently adhered to the electronics enclosure. Rather, the cooling channel may be configured to be removably connected to the electronics enclosure. This configuration would enable the cooling channel to be removed from the electronics enclosure when cooling requirements are reduced or when portability (reduced size) is of more concern and connected to the cooling channel when cooling requirements dictate. FIG. 10 illustrates a side view of an example two-chamber notebook computer 1000 having a cooling channel 1010 that is removably connected 1020 to the electronics enclosure 110 in a removed configuration.

The disclosure has focused on notebook computers but is not limited thereto. Rather it could be applied to other types of portable computers or even a desktop computer.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising
   a first chamber to house electronic components, wherein the first chamber is isolated from external environment; and
   a second chamber, sharing at least one common wall with the first chamber, having at least one inlet opening, at least one outlet opening, at least a first fan to provide airflow through the second chamber in a first direction, and at least a second fan to provide airflow through the second chamber in an alternate direction, wherein only one of the at least a first fan or the at least a second fan is operational at a time, and the one that is operational is selected based on certain parameters to provide airflow therethrough, and wherein the at least one common wall is to transfer heat from the first chamber to the second chamber, and the airflow is to cool the apparatus.

2. The apparatus of claim 1, wherein at least one electronic component in the first chamber is in thermal contact with at least one of the at least one common wall.

3. The apparatus of claim 1, wherein the at least one inlet opening and the at least one outlet opening are fitted with membranes to inhibit water and dust from flowing through the second chamber.

4. The apparatus of claim 1, wherein the second chamber includes at least one heat dispersion component to disperse the heat from at least one of the at least one common wall into the second chamber.

5. The apparatus of claim 1, wherein the second chamber is removably connected to the first chamber.

6. The apparatus of claim 1, wherein the second chamber includes a receptacle to receive an external fan.

7. A computer comprising
   an electronics enclosure, isolated from external environment, to house electronic components;
   a cooling channel having at least one inlet opening and at least one outlet opening to provide airflow therethrough for cooling, wherein the at least one inlet opening and the at least one outlet opening are fitted with a membrane to inhibit water and dust from flowing through the cooling channel, wherein the cooling channel includes at least one fan to aid in circulating air therethrough, wherein the at least one fan is to operate in a first direction to provide airflow in a first direction and a second direction to provide airflow in a second direction, wherein the direction the at least one fan is operating is switchable, and wherein heat from the electronics enclosure is transferred to the cooling channel; and
   a display electrically coupled to at least one of the electronic components.

8. The computer of claim 7, wherein the cooling channel and the electronics enclosure share at least one common wall.

9. The computer of claim 8, wherein the least one inlet opening and the at least one outlet opening are located at least partially beneath the display when the display is open.

10. The computer of claim 8, wherein at least one of the at least one inlet opening and the at least one outlet opening is aligned with at least one fan within a docking station, wherein the at least one fan within the docking station is to aid in circulating air through the cooling channel when the computer is docked in the docking station.

11. The computer of claim 7, wherein the cooling channel is removable.

12. The computer of claim 7, wherein the at least one fan includes at least a first fan to provide airflow in the first direction and at least a second fan to provide airflow in the second direction, wherein only one of the at least a first fan or the at least a second fan is operational at a time, and wherein the one that is operational is switchable.

13. A computer comprising an electronics enclosure, isolated from external environment, to house electronic components;

a display electrically coupled to at least one of the electronic components; and a cooling channel having at least one inlet opening and at least one outlet opening to provide airflow therethrough for cooling, wherein the cooling channel includes at least one fan, wherein the at least one fan is to operate in a first direction to provide airflow in a first direction and a second direction to provide airflow in a second direction, wherein the direction the at least one fan is operating is selectable, wherein the cooling channel is connected to an outer surface of the display and wherein heat from the electronics enclosure is transferred to the cooling channel via at least one heat exchange component.

14. The computer of claim 13, wherein the at least one fan includes at least a first fan to provide airflow in the first direction and at least a second fan to provide airflow in the second direction, wherein only one of the at least a first fan or the at least a second fan is operational at a time, and the one that is operational is selectable.

15. The computer of claim 13, wherein the at least one inlet opening and the at least one outlet opening are fitted with membranes to inhibit water and dust from flowing therethrough.

16. A computer comprising a sealed electronics enclosure to house electronic components, wherein the sealed electronics enclosure utilizes only passive cooling;

a cooling channel to provide airflow therethrough to cool heat from the electronics enclosure that is transferred to the cooling channel, wherein the cooling channel includes at least one inlet opening and at least one outlet opening fitted with membranes to inhibit water and dust flow therethrough, wherein the cooling channel further includes at least a first fan to provide airflow in a first direction, and at least a second fan to provide airflow in an alternate direction, wherein only one of the at least a first fan or the at least a second fan is operational at a time, and the one that is operational is selectable; and a display electrically coupled to at least one of the electronic components.

17. The computer of claim 16, wherein the display is hingably connected to the electronics enclosure and the at least one inlet opening and the at least one outlet opening are located at least partially beneath the display when the display is open.

* * * * *